2,747,234

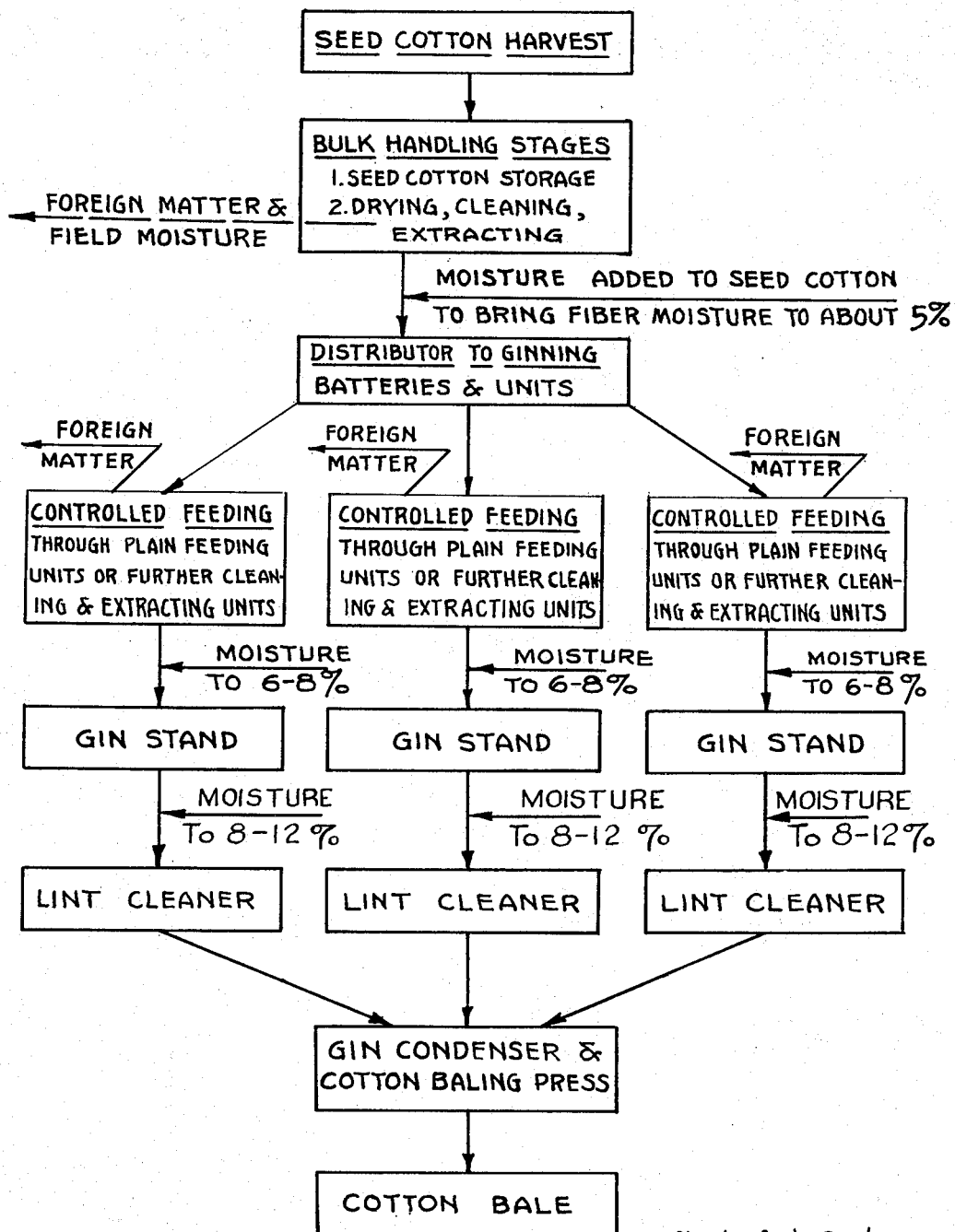

METHOD OF MOISTURE RESTORATION TO COTTON

Charles C. Speakes and Anselm C. Griffin, Jr., Leland, Miss.; dedicated to the free use of the People of the United States Application July 14, 1952, Serial No. 298,877

2 Claims. (Cl. 19—66)

(Granted under Title 35, U. S. Code (1952), sec. 266)

A non-exclusive, irrevocable, royalty-free license in the invention herein described, for all governmental purposes, throughout the world, with the power to grant sub-licenses for such purposes, is hereby granted to the Government of the United States of America.

We hereby dedicate the invention herein described to the free uses of the people in the territory of the United States to take effect on the granting of a patent to us.

During the processes that are broadly termed, "ginning," freshly harvested seed cotton makes a transition from boll to bale in several stages. Research studies have noted the importance of moisture content regulation upon the material during the several stages of ginning. Roughly harvested seed cotton from the farm may or may not be placed in storage for moisture regulation purposes of a crude nature, but the handling from the entrance of the seed cotton into the ginning system is the critical period. In the modern cotton gin, roughly harvested seed cotton is first subjected to bulk drying, then cleaning and extracting whereby the removal of foreign matter may be effected while having the fiber at an optimum moisture content of from 2 to 5 percent.

Following these bulk handling stages, the partially cleaned seed cotton is usually delivered to a distributor where the bulk flow is divided into a number of controlled small streams of definite volumes commensurate with the number of batteries of feeders, gin-stands and lint cleaners in the ginning outfit. One object of our invention is to regulate the moisture content immediately prior to the said distribution.

Following the distribution, seed cotton usually passes to plain feeders on the one hand, or to elaborate controlled combinations of cleaners, extractors, dryers, etc., on the other, depending upon the extent of equipment within the cotton gin. A second object of our invention is to restore moisture to the seed cotton as it leaves these feeders or their alternative combinations, and by means of that restoration prior to separation of fiber and seed to obtain obtimum results in smoothness and fiber lengths at moisture contents between at least 6 and 8 percent.

From the gin-stand batteries where the fiber and seed are separated, the fiber passes in the modern gins through a lint cleaner and thence to the condenser and press where at least 8 to 12 percent moisture content is of great assistance in pressing. A third object of our invention is thus to restore more moisture between the actual ginning and pressing to achieve the purposes aforesaid.

In other types of moisture work with seed cotton, attempts have been made to restore moisture in the drying tower, feeders and on the lint slide. Our invention departs from these and comprises a process that applies a combination of several principles of moisture restoration at specifically other salient points in the early ginning stages which do not interfere with adequate drying, cleaning and extracting of seed cotton that are requisite to the element of cotton grade known as "leaf," and at progressive points thereafter that tend to eliminate both fiber shortening and weakening, said benefits being requisite to the grade elements of quality known as "staple length" and "character."

Absorption time is an important element in the restoration of moisture to cotton fiber—not in the surface wetting but into the body structure of the fiber. To that end, we have for the first time provided an increase in moisture content by steps to suit the individual requirements of the cottons.

According to the instant invention, roughly harvested seedcotton is adjusted to a moisture content of about 5% and cleaned. By "cleaned" is meant a processing of the seedcotton whereby dirt particles are removed, sticks are extracted, etc., such processing, in some cases, involving also some drying of the seedcotton. The cleaned seedcotton is then adjusted to a moisture content of about from 6% to 8% and ginned to separate the seeds from the fibers. Thereafter, the ginned seedcotton is adjusted to a moisture content of about from 8% to 12% and baled.

For a detailed description of the invention, reference is made to the accompanying drawing.

The single figure illustrates by flow diagram chart the salient processes in a modern three-stand cotton ginning apparatus that is representative of all sizes of gins and depicts the points where the moisture restoration methods of the present invention are applied. After the initial bulk handling stages, but prior to actual delivery of the seed cotton to the distributors, there are applied by means not shown: (1) wetting agent solutions and heat; (2) steam vapor, heat, and pressure; or (3) air conditioning for humidity and refrigeration within the limits herein described.

These wetting agents may be non-ionic, penetrant, detergent, hygroscopic and of other forms.

Wetting agent solutions, known as surface acting agents that reduce surface tension, such as sulfonated oil chemicals, may be used. One pound of concentrated wetting agent is usually supplied to fifty gallons or less of water. It may be applied in mist form at rates of from 1 to 37 pounds of dilute solution to fifteen hundred pounds of seed cotton. If regional conditions cause the cotton to be ultra dry, we may add a treatment chamber using hot steam vapor which travels within the body of the chamber as an additional restorer of fiber moisture. Further, if the foregoing two stages of treatments necessitate a third additional intensifying with humid air and refrigeration to obtain more rapid restoration of moisture to the fiber, we add such treatment to the two foregoing ones.

After the fiber has been separated from the seed in the ginstand, to obtain the best pressing conditions, we provide the final fiber moisture restoration to a moisture content of between 8 and 12 percent. In this step surface active agents are not usually used; but humid vapors from steam, high relative humidity air, and refrigeration may best be employed.

Referring now in particular to the operation of the invention as shown in the drawing, it will be seen that moisture is first applied after the bulk handling stages to raise the fiber moisture content to about 5%. This stage is chosen for the initial moistening step because it least interferes with removal of foreign matter from the seed cotton. Secondly, moisture is then applied after the seed cotton has passed through the distributor and is in smaller streams under regulated flow, but before it enters the gin-stand where the cotton fibers are separated from the seed. This separation is best carried out when the fiber moisture content approaches about 8%. The third moistening step takes place after the seed and fiber are separated and is applied to the freshly ginned fibers to obtain a fiber moisture content of 8–12%. This is the optimum moisture content for the pressing and baling step. While stored in the bale, the fiber gradually reaches an equilibrium moisture content approximating the satisfactory trade basis of 8½%.

As part of our method and moisture restoration process, we may employ air volumes ranging from 1 to 45 cu. ft. per pound of seed cotton to convey water vapor to the fiber; temperatures ranging from 32° F. to 252° F. in order to penetrate the fiber wax and expedite moisture restoration; and pressures at one pound absolute to 30 lbs. absolute, namely, from high vacuum to 16 lbs. gage to assist in the rapid delivery of moisture to the fiber; these being used in combinations from any one to all as may be required to meet specific exigencies during the ginning.

We claim:

1. A process for the treatment of cotton comprising contacting seedcotton with a dilute aqueous solution of a surface active agent to adjust the fiber moisture content of the seedcotton to about 5%, cleaning the seedcotton to remove foreign matter, contacting the cleaned seedcotton with additional aqueous solution of a surface active agent to increase the fiber moisture content of the seedcotton to from 6 to 8%, ginning the seedcotton to separate the seeds from the fibers, contacting the ginned cotton with humid vapors to adjust its fiber moisture content to from 8 to 12% and baling the cotton.

2. A process for the treatment of cotton comprising contacting seedcotton with an aqueous medium to adjust the fiber moisture content of the seedcotton to about 5%, cleaning the seedcotton to remove foreign matter, contacting the cleaned seedcotton with additional aqueous medium to increase the fiber moisture content of the seedcotton to from 6 to 8%, ginning the seedcotton to separate the seeds from the fibers, contacting the ginned cotton with an aqueous medium to adjust its fiber moisture content to from 8 to 12% and baling the cotton.

References Cited in the file of this patent

UNITED STATES PATENTS

| Number | Name | Date |
|---|---|---|
| 227,767 | Groom | May 18, 1880 |
| 1,460,519 | Wadsworth | July 3, 1923 |
| 1,688,524 | Cobb | Oct. 23, 1928 |
| 1,707,929 | Bennett | Apr. 2, 1929 |
| 1,954,383 | Herring | Apr. 10, 1934 |
| 2,019,079 | Herring | Oct. 29, 1935 |
| 2,044,937 | Eustis | June 23, 1936 |
| 2,158,752 | Fowler | May 16, 1939 |
| 2,161,170 | Jones | June 6, 1939 |
| 2,312,557 | Joyce | Mar. 2, 1943 |